(12) United States Patent
Aloni

(10) Patent No.: US 8,651,126 B2
(45) Date of Patent: Feb. 18, 2014

(54) CONTROLLABLE AND CLEANABLE STEAM TRAP APPARATUS

(75) Inventor: Yehoshua Aloni, Kochav Yair-Zur Yigal (IL)

(73) Assignee: Teva Pharmaceutical Industries, Ltd., Petach-Tikva (IL)

( * ) Notice: Subject to any disclaimer, the term of this patent is extended or adjusted under 35 U.S.C. 154(b) by 1055 days.

(21) Appl. No.: 12/313,563

(22) Filed: Nov. 20, 2008

(65) Prior Publication Data

US 2009/0199907 A1 Aug. 13, 2009

Related U.S. Application Data

(60) Provisional application No. 61/003,952, filed on Nov. 21, 2007.

(51) Int. Cl.
*F17D 3/00* (2006.01)
(52) U.S. Cl.
USPC .......... 137/1; 137/15.01; 137/171; 137/241; 137/468
(58) Field of Classification Search
USPC ............ 137/171, 203, 468, 238, 241; 236/56
See application file for complete search history.

(56) References Cited

U.S. PATENT DOCUMENTS

| | | | |
|---|---|---|---|
| 834,991 A * | 11/1906 | McElroy | 137/434 |
| 3,905,385 A | 9/1975 | Green et al. | |
| 4,261,382 A | 4/1981 | Bridges | |
| 4,372,916 A * | 2/1983 | Chamberlain et al. | 422/26 |
| 4,395,383 A | 7/1983 | Kackos | |
| 4,646,965 A | 3/1987 | Anderson et al. | |
| 4,687,635 A | 8/1987 | Kaehler et al. | |
| 4,705,212 A * | 11/1987 | Miller et al. | 137/171 |
| 4,788,849 A | 12/1988 | Yonemura et al. | |
| 4,830,277 A | 5/1989 | Hood | |
| 4,872,974 A | 10/1989 | Hirayama et al. | |
| 4,898,022 A | 2/1990 | Yumoto et al. | |
| 4,971,764 A | 11/1990 | Albright | |
| 5,196,165 A * | 3/1993 | Harrell et al. | 422/26 |
| 5,478,012 A | 12/1995 | Fujiwara et al. | |
| 5,512,249 A | 4/1996 | Singh | |
| 5,549,134 A | 8/1996 | Browne et al. | |

(Continued)

FOREIGN PATENT DOCUMENTS

EP 01771192 A2 4/1986
WO WO 00/78365 12/2000

(Continued)

OTHER PUBLICATIONS

PCT International Search Report issued on Jul. 21, 2010 in connection with PCT/US2010/01466, filed May 18, 2010.

(Continued)

*Primary Examiner* — Craig Schneider
*Assistant Examiner* — Craig J Price
(74) *Attorney, Agent, or Firm* — John P. White; Cooper & Dunham LLP

(57) ABSTRACT

An apparatus and a method for removing condensate and unwanted gas from vapor/liquid systems while preventing steam loss are provided. The steam trap apparatus replaces the automatic valve type, non-sanitary steam trap with an efficient, controllable, and sanitary steam trap. In addition, the improved steam trap apparatus allows for real-time data collection and eliminates the need for additional piping and actuated valves for sterilization and cleaning purposes.

33 Claims, 15 Drawing Sheets

(56) References Cited

U.S. PATENT DOCUMENTS

| | | | |
|---|---|---|---|
| 5,623,990 | A | 4/1997 | Pirkle |
| 5,687,755 | A | 11/1997 | Farquhar et al. |
| 6,145,529 | A | 11/2000 | Hellman et al. |
| 6,220,519 | B1 | 4/2001 | Page, Jr. et al. |
| 6,279,593 | B1 | 8/2001 | Sheppard |
| 6,453,802 | B1 | 9/2002 | Manganiello et al. |
| 6,571,180 | B1 | 5/2003 | Turner et al. |
| 6,644,131 | B2 * | 11/2003 | Rebik .......................... 137/185 |
| 6,644,132 | B1 | 11/2003 | Baumoel |
| 6,688,329 | B2 * | 2/2004 | Murray et al. ................ 137/392 |
| 7,246,036 | B2 | 7/2007 | Cheskaty et al. |
| 2003/0195472 | A1 | 10/2003 | Green et al. |
| 2004/0211569 | A1 | 10/2004 | Vinegar et al. |
| 2006/0110280 | A1 | 5/2006 | Nelson et al. |
| 2006/0137817 | A1 | 6/2006 | Ma et al. |
| 2008/0270047 | A1 | 10/2008 | Quake et al. |
| 2010/0294377 | A1 | 11/2010 | Aloni et al. |

FOREIGN PATENT DOCUMENTS

| | | |
|---|---|---|
| WO | WO/2007/038072 | 4/2007 |
| WO | WO/2009/067246 | 5/2009 |
| WO | WO2010/134977 | 11/2010 |
| WO | WO 2010/134977 A1 | 11/2010 |

OTHER PUBLICATIONS

Written Opinion of the International Searching Authority issued on Mar. 30, 2010 in connection with PCT/US 10/00146, filed May 18, 2010.

PCT International Search Report issued on Jan. 14, 2009 in connection with PCT/US2008/013001, filed Nov. 21, 2008.

Written Opinion of the International Searching Authority issued on Jan. 14, 2009 in connection with PCT/US2008/013001, filed Nov. 21, 2008.

U.S. Appl. No. 12/800,589, filed May 18, 2010, Yeshoshua Aloni and Oren Fahimipoor.

International Preliminary Report on Patentability dated May 25, 2010 in connection with International Application No. PCT/US08/013001.

Spirax Sparco USA. "Steam Traps and . . . " Spirax Sarco. 2010. http://spiraxsarco.com/resources/steam-engineering-tutorials/steam-traps-and-steam-trapping.asp. Jun. 29, 2010.

Written Opinion of the International Searching Authority issued Jul. 21, 2010 in connection with International Application No. PCT/US2010/01466.

International Preliminary Report on Patentability issued Dec. 22, 2011 in connection with International Application No. PCT/US2010/001466.

Feb. 14, 2013 Office Action issued in connection with U.S. Appl. No. 12/800,589.

May 9, 2013 Amendment in connection with U.S. Appl. No. 12/800,589.

European Search Report issued Jun. 13, 2013 in connection with European patent application No. EP10778041.3.

* cited by examiner

Steam Trap Apparatus

Time to reach 122°C

System Efficiency

CONTROLLABLE AND CLEANABLE STEAM TRAP APPARATUS

This application claims the benefit of U.S. Provisional Application No. 61/003,952, filed Nov. 21, 2007, the entire content of which is hereby incorporated by reference herein.

Throughout this application various publications and published patents are referenced. The disclosures of these publications in their entireties are hereby incorporated by reference into this application in order to more fully describe the state of the art to which this invention pertains.

TECHNICAL FIELD

This application relates to apparatuses, methods, and systems for removing condensate, air, and non-condensable gas from steam space while preventing the loss of steam. In particular, this application relates to improved steam trap apparatus.

BACKGROUND OF THE INVENTION

In industry, steam, the vaporized form of water, is often used as a repository of energy due to water's high heat of vaporization. Energy is introduced and extracted by heat transfer, and transported in the form of steam from one area of a manufacturing plant to another through pipes.

Steam trap apparatuses are necessary elements of any steam system because they allow steam to reach its destination in as dry a state as possible to perform its task efficiently and economically. Steam trap apparatuses release condensate, air, and non-condensable gas from a steam space while preventing the loss of steam.

Inadequate steam trapping can lead to various undesirable results from steam system inefficiency to waterhammer, corrosion, leakage, and high maintenance costs.

U.S. Pat. Nos. 4,646,965, 4,830,277, 4,898,022, 5,478,012, 6,220,519, 6,279,593, 6,453,802, 6,571,180, and 6,644,131 disclose apparatus and methodologies which can be used to remove condensate and other unwanted gas from steam systems and which are incorporated by reference herein in their entireties.

The conventional steam trap apparatus is comprised of two actuated valves, piping, and a steam trap which is typically an automatic valve not connected to a control system. One actuated valve is situated upstream from the steam trap while the other is positioned in a bypass line upstream from the first actuated valve. The two actuated valves provide a bypass mechanism which is needed for the cleaning of the steam trap apparatus. The outlet of the steam trap and the bypass valve can lead to a condensate return system which re-heats the condensate to form steam or to a drain.

Steam traps are generally of three types: thermostatic, mechanical, and kinematic; each of which contains a number of specific styles.

Thermostatic steam traps are operated by sensing changes in temperature of a fluid, which by definition can include liquids and gases. Three typical types of thermostatic steam traps are the "liquid expansion traps", the "bimetallic traps", and the "balanced pressure thermostatic traps". Thermostatic steam traps may be a misnomer as these steam traps open and close by mechanical operations. An operating element which is responsive to temperature "changes within the desired range is built into the valve so that when the necessary temperature is reached, they react in a way to block the passage of steam to the outlet.

Mechanical steam traps are operated by sensing changes in fluid density. These steam traps operate by sensing the difference in density between steam and condensate. These steam traps include the "ball float traps" and the "inverted bucket traps". In a ball float trap, the ball rises in the presence of condensate, opening a valve which passes the denser condensate. In an inverted bucket trap, the inverted bucket floats when steam reaches the trap and rises to shut the valve.

Kinematic steam traps, sometimes called thermodynamic steam traps, are operated by sensing changes in fluid dynamics. These steam traps rely partly on the formation of flash steam from condensate. This group includes the "thermodynamic", the "disc", the "impulse" and the "labyrinth" steam traps.

The three types of steam traps are more comprehensively described in industry catalogues from manufacturers such as Spirax Sarco Inc. (Blythewood, S.C.). The Spirax Sarco steam trap catalogue can be found at the following web address: spiraxsarco.com/resources/steam-engineering-tutorials/steam-traps-and-steam-trapping.

SUMMARY OF THE INVENTION

This disclosure describes an apparatus and method for removing condensate and unwanted gas from the steam space in a steam system while preventing steam loss. In an embodiment, this disclosure provides an apparatus and method for removing condensate and unwanted gas from the vapor space in any vapor system while preventing vapor loss.

These and other objects, features and advantages of the present invention are specifically set forth in or will become apparent from the following detailed descriptions of the invention when read in conjunction with the accompanying drawings.

BRIEF DESCRIPTION OF THE DRAWINGS

The features of the present application can be more readily understood from the following detailed description with reference to the accompanying drawings wherein:

FIG. 7: shows graphs of data collected during the beginning period of SIP operation.

DETAILED DESCRIPTION

Figure 1:
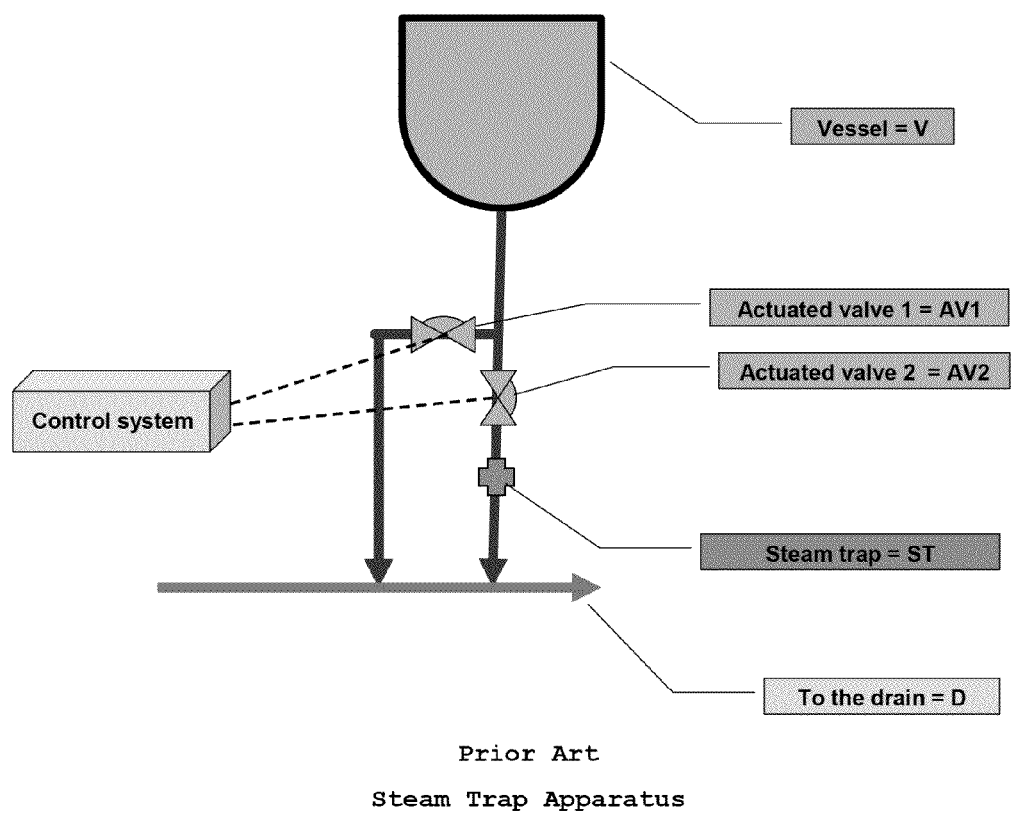
FIG. 1: shows a schematic diagram of a conventional steam trap apparatus.

This invention provides an apparatus for removing condensate, air, and non-condensable gas from vapor space in a vapor system while preventing the loss of vapor, the apparatus comprising:
- a temperature sensor, positioned at a point in the vapor system where condensate, air, or non-condensable gas collect,
- an actuated valve in a position allowing for the release of condensate, air, or non-condensable gas from the vapor space, and
- a control system which receives output from said temperature sensor and determines whether to open the actuated valve to release condensate, air or non-condensable gas from the vapor space based on temperature reading from the temperature sensor.

In an embodiment of the apparatus, the temperature sensor is positioned in the actuated valve.

In an embodiment of the apparatus, the actuated valve is a sanitary valve. The actuator for the actuated valve may be mechanical, electrical, electromechanical, pneumatic, or human. The actuated valve may be positioned downstream from the temperature sensor.

In another embodiment of the apparatus, the temperature sensor may be a thermometer, a thermocouple, a temperature sensitive resistor such as a thermistor or a resistance temperature detector, a bimetal thermometer, or a thermostat.

In one embodiment, the temperature sensor is located directly in the pipes or the actuated valve. In another embodiment, the temperature sensor is located within a thermowell pocket. In yet another embodiment, the thermowell pocket further comprises glycerol.

In one embodiment, the actuated valve is positioned downstream from the temperature sensor.

In one embodiment, the control system is programmed to allow input of time intervals which represent the time delay between a signal to open or close the actuated valve and the opening or closing of the actuated valve.

In one embodiment, the distance between the vapor space and the actuated valve is 100 cm or less. In another embodiment, the distance between the vapor space and the actuated valve is 5 cm or less.

In one embodiment, the pressure in the vapor space is greater than 2.25 bar. In another embodiment, the pressure in the vapor space is at least 2.5 bar.

This invention also provides a method for removing condensate, air, and non-condensable gas from vapor space in a vapor system while preventing the loss of vapor, the method comprising:
- a) measuring a temperature at a region in the vapor system where condensate, air, or non-condensable gas collect;
- b) determining whether the temperature obtained in a) represents the presence of condensate, air, or non-condensable gas; and
- c) opening an actuated valve if the temperature obtained in a) is determined to represent presence of condensate, air, or non-condensable gas.

In the method, the temperature may be obtained at the actuated valve. The actuated valve may be a sanitary valve.

In one embodiment, the temperature is obtained directly from within the pipes or the actuated valve. In another embodiment, the temperature is obtained from within a thermowell pocket. In yet another embodiment, the thermowell pocket further comprises glycerol.

Also in the method, the determining step in b) can be automated. The automation may be achieved by a control system. In another embodiment, the control system is programmed to allow input of time intervals which represent the time delay between a signal to open or close the actuated valve and the opening or closing of the actuated valve. In another embodiment, the actuated valve opening time interval is no more than 2 seconds. In yet another embodiment, the actuated valve opening time interval is no more than 1 second.

In one embodiment, the distance between the vapor space and the actuated valve is 100 cm or less. In another embodiment, the distance between the vapor space and the actuated valve is 5 cm or less.

In one embodiment, the pressure in the vapor space is greater than 2.25 bar. In another embodiment, the pressure in the vapor space is at least 2.5 bar. This invention further provides a steam trap apparatus for removing condensate, air, and non-condensable gas from steam space in a steam system while preventing the loss of steam, the apparatus comprising:
- a temperature sensor, positioned at a point in the steam system where condensate, air, or non-condensable gas collect,
- an actuated valve in a position allowing for the release of condensate, air, or non-condensable gas from the steam space, and
- a control system which receives output from said temperature sensor and determines whether to open the actuated valve to release condensate, air or non-condensable gas from the steam space based on temperature reading from the temperature sensor.

In an embodiment of the apparatus, the temperature sensor is positioned in the actuated valve.

In an embodiment of the apparatus, the actuated valve is a sanitary valve. The actuator for the actuated valve may be mechanical, electrical, electromechanical, pneumatic, or human. The actuated valve may be positioned downstream from the temperature sensor.

In another embodiment of the apparatus, the temperature sensor may be a thermometer, a thermocouple, a temperature sensitive resistor such as a thermistor or a resistance temperature detector, a bimetal thermometer, or a thermostat.

In one embodiment, the temperature sensor is located directly in the pipes or the actuated valve. In another embodiment, the temperature sensor is located within a thermowell pocket. In yet another embodiment, the thermowell pocket further comprises glycerol.

In one embodiment, the actuated valve is positioned downstream from the temperature sensor.

In one embodiment, the control system is programmed to allow input of time intervals which represent the time delay between a signal to open or close the actuated valve and the opening or closing of the actuated valve.

In one embodiment, the distance between the steam space and the actuated valve is 100 cm or less. In another embodiment, the distance between the steam space and the actuated valve is 5 cm or less.

In one embodiment, the pressure in the steam space is greater than 2.25 bar. In another embodiment, the pressure in the steam space is at least 2.5 bar.

This invention further provides a method for removing condensate, air, and non-condensable gas from steam space in a steam system while preventing the loss of steam, the method comprising:
- a) measuring a temperature at a region in the steam system where condensate, air, or non-condensable gas collect;
- b) determining whether the temperature obtained in a) represents the presence of condensate, air, or non-condensable gas; and
- c) opening an actuated valve if the temperature obtained in a) is determined to represent presence of condensate, air, or non-condensable gas.

In the method, the temperature may be obtained at the actuated valve. The actuated valve may be a sanitary valve.

In one embodiment, the temperature is obtained directly from within the pipes or the actuated valve. In another embodiment, the temperature is obtained from within a thermowell pocket. In yet another embodiment, the thermowell pocket further comprises glycerol.

Also in the method, the determining step in b) can be automated. The automation may be achieved by a control system. In another embodiment, the control system is programmed to allow input of time intervals which represent the time delay between a signal to open or close the actuated valve and the opening or closing of the actuated valve. In another embodiment, the actuated valve opening time interval is no more than 2 seconds. In yet another embodiment, the actuated valve opening time interval is no more than 1 second.

In one embodiment, the distance between the vapor space and the actuated valve is 100 cm or less. In another embodiment, the distance between the vapor space and the actuated valve is 5 cm or less.

In one embodiment, the pressure in the vapor space is greater than 2.25 bar. In another embodiment, the pressure in the vapor space is at least 2.5 bar.

For the purposes of this application:

The term "vapor" means the gaseous phase of any material.

The term "vapor system" means the combination of equipment which are connected for the purposes of transporting and cycling fluid matter, whether in the form of condensate or vapor, and the maintenance thereof, which can include but is not limited to a boiler, feed system, pumps, piping, valves, condensate return system, and drain.

The term "vapor space" means the portion of a vapor system where vapor is contained, which can include but is not limited to the interior of pipes, vessels, or other types of container and equipment.

The term "steam system" means the combination of equipment which are connected for the purposes of transporting and cycling water, whether in the form of condensate or steam, and the maintenance thereof, which can include but is not limited to a boiler or steam generating unit, feedwater system, pumps, piping, valves, condensate return system, and drain.

The term "steam space" means the portion of a steam system where steam is contained, which can include but is not limited to the interior of pipes, vessels, or other types of container and equipment.

The term "actuated valve" means a valve which is controlled by some outside force, be it manual, pneumatic or electronic. Actuated valves specifically exclude the three common known types of steam traps, the thermostatic, the mechanic, and the kinetic steam trap.

The term "sanitary valve" means a diaphragm or membrane or any other type of cleanable valve which is designed for use in applications requiring clean or sterile processing and is constructed using compliant materials that can withstand sanitizing and sterilizing methods.

The term "thermowell" means the instruments used in industrial temperature measurement to provide isolation between a temperature sensor and the environment whose temperature is to be measured.

The term "control system" means a device or set of devices which regulates the behavior of other devices or systems. In one embodiment, it can be a computer which automatically or with user interface controls other devices via electronic signals.

The term "temperature sensor" means a device or set of devices which obtain information for temperature measurement, and which may be connected to send the data to another control device.

There are multiple problems with the conventional steam trap apparatuses and steam traps.

First, the conventional steam traps are without capability to be re-set or controlled once installed. This is because the operation of an automatic valve is purely mechanical. For example, a typical embodiment of a thermostatic steam trap is the bimetallic steam trap. The operating element of a bimetallic steam trap is a bimetallic disk constructed using two strips of dissimilar metals welded together. The element deflects when heated, thereby blocking the passage of steam to the condensate return line or drain.

However, temperature is not the only parameter which affects the formation of steam. Other operating conditions such as pressure (P) and load (V) affects the vaporization of water. When load is fixed, water vaporizes according to a steam saturation curve; the higher the pressure in the system, the higher the saturation temperature of steam. The steam saturation curve is a concave arc. On the other hand, the operating curve of a bimetallic steam trap is essentially linear due to the slow response of metals to changing conditions.

Furthermore, it is possible that the steam trap operating temperature is actually above the steam saturation temperature at low pressures. As a result, the steam trap would release steam at these lower pressures, causing steam loss. It may be possible to manufacture the steam trap to ensure that this portion of the saturation curve is always above the operating curve. However, due to the linear action of the element, the difference between the two lines would increase even more with system pressure, increasing the waterlogging effect, where condensate collects and the valve remains closed, preventing condensate drain.

More innovative bimetallic steam traps use multiple layers of metal. In multi-layer bimetallic steam traps, different layers of bimetal disks are used so that one set of bimetal element deflects to give response to one pressure range.

At a higher temperature, a second set of bimetal element contributes to give response to a different pressure range. In this way, the operating curve of the steam trap can be manipulated to more closely resemble the steam saturation curve. Though an improvement on the former design, the operating curve of this steam trap still does not exactly replicate the steam saturation curve, which is desirable for efficient operation of the steam trap apparatus.

Other automatic-valve-type steam traps similarly suffer from inflexibility in response to varying operating conditions.

In addition, all types of the conventional steam trap are not sanitary and therefore not easy to clean in place and sterilize in place. These steam traps contain crevices, and hard to reach, hard to clean openings, making them susceptible to dirt, debris and corrosion. Furthermore, often times the steam traps are not constructed from material that can withstand sanitizing/sterilizing methods. While sanitary steam traps are not required in some industries, the pharmaceutical, biopharmaceutical, cosmetics and food industry requires it.

Finally, it is difficult to detect the malfunction of a steam trap. Moreover, when a conventional, automatic valve type steam trap is broken or plugged off, it usually needs to be replaced. Often the malfunction is noticed during sterilization process and it is too late in the process for fixing. In the worst case scenario the valve is broken without any indication and goes unnoticed. In this case the sterilized system will be contaminated.

There is a need for improvements to the techniques and apparatuses for steam trapping to increase efficiency, flexibility, controllability, cleanability, and simplicity.

This disclosure describes improvements to methodologies and apparatuses for removing condensate and unwanted gas from the steam space in a steam system while preventing steam loss. The improved methodology and apparatus is simpler, more efficient and more flexible than the existing steam trapping apparatuses, is truly sanitary, can be cleaned and sterilized easily, is highly programmable and controllable, and allows for real-time data collection. This disclosure includes improvements to methodologies and apparatuses for removing condensate and unwanted gas from the vapor space in any vapor system while preventing vapor loss.

Exemplary embodiments of the present invention will be explained below while referring to the accompanying drawings.

Figure 2:
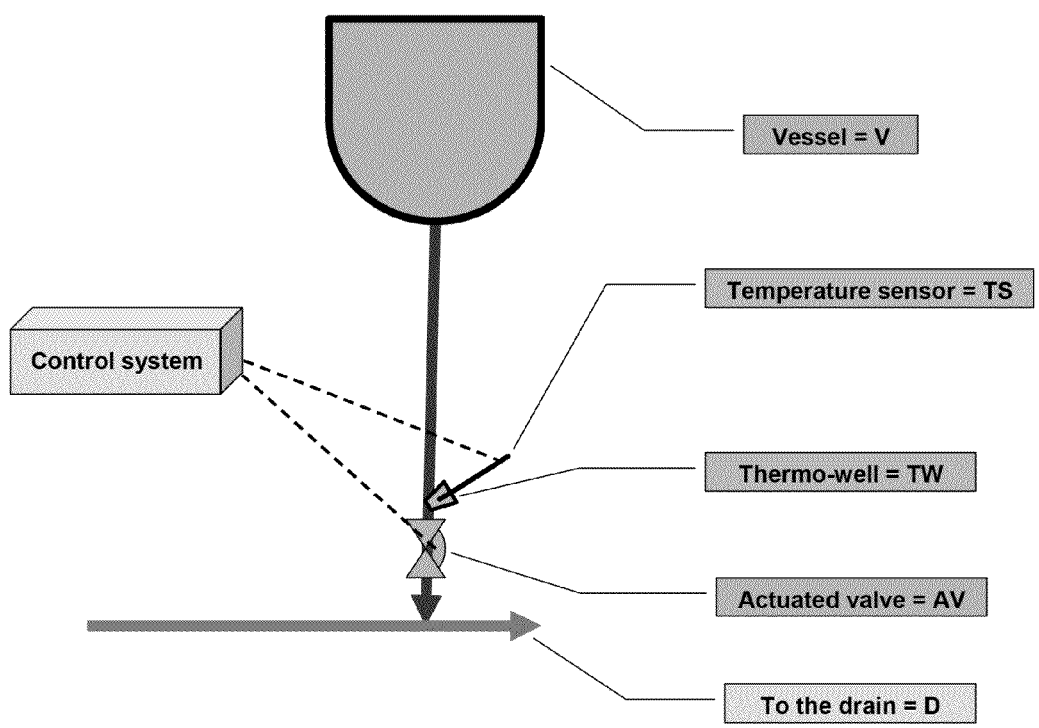
FIG. 2: shows a schematic diagram of a steam trap apparatus according to an exemplary embodiment of this application. The apparatus allows condensate and other unwanted gas to be separated from the steam system so that the steam in the steam system can reach its destination in as dry a state as possible to perform its task efficiently and economically. The temperature sensor (TS) is positioned at a point in the steam system where condensate, air, and non-condensable gas are likely to gather, senses the temperature in the area, and sends a corresponding output to a control system, which compares the output from the temperature sensor (TS) to the saturation temperature at the specific operating condition, as determined by an algorithm or user input, and sends an output to an actuated valve (AV) positioned downstream from the temperature sensor (TS) to open to release condensate, or to close to retain steam. In this exemplary embodiment, the temperature sensor (TS) is located in a thermowell pocket (TW).

FIG. 1 shows a schematic diagram of a conventional steam trap apparatus, including a bypass line; FIG. 2 shows a schematic diagram of a steam trap apparatus according to an exemplary embodiment of this application.

A Controllable and Cleanable Steam Trap apparatus (CCST) for removing condensate and unwanted gas from a steam system while preventing steam loss will be described with reference to FIG. 2. The apparatus allows condensate and other unwanted gas to be separated from the steam system so that the steam in the steam system can reach its destination in as dry a state as possible to perform its task efficiently and economically.

In one embodiment of this application, an improved steam trap apparatus comprising an electronically controlled temperature sensor with a transmitter positioned at a point in the steam system where condensate, air, and non-condensable gas are likely to gather, senses the temperature in the area, and sends a corresponding output to a control system, which compares the output from the temperature sensor to the saturation temperature at the specific operating condition, as determined by an algorithm or user input, and sends an output to an actuated valve positioned downstream from the temperature sensor to open to release condensate, or to close to retain steam. The temperature sensor can be positioned in the valve itself.

The improved steam trap apparatus allows for more flexible and efficient operation because it is responsive to varying operating conditions. In addition, the improved steam trap apparatus simplifies the complicated existing system used for sterilization-in-place ("SIP") and cleaning-in-place ("CIP") by eliminating the need for extra valves and piping. Also, the improved steam trap apparatus is truly sanitary and cleanable. Finally, the improved steam trap apparatus is highly programmable and controllable, and allows for real-time data to be collected (such as temperature and valve position) during operation, cleaning, or sterilization.

In this improved system, an electronically controlled temperature sensor with a transmitter is positioned at a point in the steam system where condensate, air, and non-condensable gas are likely to gather, which can include at the actuated valve itself. The electronically controlled temperature sensor sends an output to an attached control system via its transmitter which reflects temperature sensed in the steam system. The control system has a programmable temperature setting which dictates the temperature which triggers the opening or closing of an actuated valve situated downstream from the temperature sensor. The actuated valve serves as a steam trap, with an outlet to condensate return or to drain. The temperature setting will depend on the operation. The temperature setting can be determined by user input or by an algorithm which takes into account other operating parameters such as the load or the pressure so as to allow the operating curve of the steam trap apparatus to perfectly replicate the steam saturation curve, thereby optimizing steam trap operating efficiency.

A saturation curve is a graph that indicates the saturation temperature of a given liquid at various pressures. The saturation temperature is the temperature at which a liquid boils into its vapor phase for a corresponding saturation pressure. The liquid can be said to be saturated with thermal energy. Any addition of thermal energy results in a phase change. As pressure increases, the saturation temperature increases, but not linearly. On a steam saturation curve, the curve indicates the point at which water and steam can coexist for a given pressure, both being at the saturation temperature.

Ideally, the operating curve of the steam trap should replicate the steam saturation curve, and the valve opens and closes at the exact point of saturation of water, to achieve optimum efficiency.

In the improved steam trap apparatus, the temperature which triggers the actuated valve will reflect the actual saturation temperature ($T_{sat}$) at the operating pressure and load. This can be accomplished by programming the saturation points at varying operating parameters into the control system. The saturation temperature and pressure data for common elements such as water can be found in Perry's Chemical Engineers' Handbook, $7^{th}$ ed. Perry and Green, McGraw-Hill Professional; 7 edition (Jun. 1, 1997). This data is incorporated by reference herein.

The control system can obtain operating parameters such as pressure and load by other sensors in the system or by user input. The control system, through an algorithm, then determines the corresponding saturation temperature.

In a normal steam operation the temperature setting is $T_{sat}$=121° C., the saturation temperature of steam at 1 atm, the standard atmospheric pressure and the pressure at earth's sea level. When the steam system temperature is above $T_{sat}$, the steam in the system is dry and the control system closes the actuated valve to prevent steam loss. When the steam system temperature is below $T_{sat}$, the steam in the system has lost heat and became condensate, the control system opens the valve to drain the condensate.

In addition, users can bypass the algorithm which determines $T_{sat}$ to be the triggering point of the actuated valve, and manually re-program the control system to open and close the actuated valve to fit the cleaning needs.

Further, in the conventional steam trap apparatus, because the steam trap itself is not a controllable valve, it is supplemented by two actuated valves and extra piping to allow for sterilization and cleaning operations. This apparatus will be described with reference to FIG. 1. The two actuated valves can be actuated pneumatically, electrically, or any other actuation type and can be sanitary valve. The steam trap itself can be thermostatic, mechanical or kinematic, but it is not sanitary as there are no truly sanitary steam traps. The two actuated valves are attached to a control system which dictates the opening or closing of the valves depending on the pre-setting.

In the conventional steam trap apparatus, the steam system is connected to the actuated valves by diverging piping in which one line from the steam system branches into two lines connected to condensate return or the drain. The first line contains an actuated valve (AV 1) with an outlet to the condensate return line or the drain. This is the bypass line. The other line connects to the second actuated valve (AV 2) which is situated upstream from the steam trap with an outlet to the condensate return or the drain. This complicated arrangement of instruments is necessary to allow for CIP and SIP of the steam traps.

The pharmaceutical, biopharmaceutical, cosmetics and food industries utilizes equipment made of high grade stainless steel (S.S.), such as fermentors, that are too large or too inconvenient to place in either an autoclave, oven or parts washer for sterilization or cleaning. SIP is a process for sterilizing such processing equipment. A typical SIP process, which is used to kill microorganisms, mimics an autoclave operation and consists of the following steps: air purge, heating period, sterilization holding period, sterile displacement and collapse of the steam blanket.

SIP is a time-dependent process that should approach a well-defined steady state, corresponding to the sterilization conditions. Sterilization can be accomplished by thermal, chemical, or other methods, but the United States Food and Drug Administration (FDA) (1975) and the European Economic Community (EEC) (1990) state preference for thermal methods. The process generally subjects the equipment(s) to a certain pressure and high temperature for an amount of time. (FDA regulations (1975) requires that sterilization meet or be equivalent to the following conditions: 121.5° C. maintained for 20 minutes with saturated steam). Since the typical temperature of sterilization is in the range of 121° C. to 125° C., steam is generally used for SIP purposes.

CIP operation, on the other hand, is the common method to clean process equipments in general. The medium for cleaning is generally a room temperature cleaning liquid, but sometimes a hot cleaning liquid may be required.

In a conventional steam trap apparatus, the actuated valve in the bypass line (AV 1) is closed while the actuated valve in the steam trap line (AV 2) is open at the start of SIP. During SIP, when the temperature is below $T_{sat}$, condensate forms, and the steam trap automatically opens to drain the condensate. When the temperature rises to above $T_{sat}$, the steam trap automatically closes thus avoiding steam loss. Hot steam remains in the apparatus for the duration of the exposure time required for sterilization of the equipment. At the end of SIP, temperature returns to below $T_{sat}$ and the steam trap automatically opens again to allow condensate to drain.

Unlike the SIP operation, the CIP operation utilizes the bypass line in a conventional steam trap apparatus. In this apparatus, the actuated valve in the bypass line (AV 1) is open while the actuated valve in the steam trap line (AV 2) is closed to allow for cleaning liquid through the pipes without affecting the steam trap. The bypass line is needed to avoid getting cleaning liquid into the steam trap, which will be automatically open during the CIP operation since the temperature is below $T_{sat}$.

The improved steam trap apparatus does away with the need for this complex arrangement by utilizing a single actuated valve for SIP, CIP and steam trapping. During CIP, the improved steam system does not need bypass and therefore eliminates dead-leg. Furthermore, during SIP, CIP, or any operation, real-time data can be collected since both the temperature sensor and the valve is attached to the control system.

Thus, the improved steam trap apparatus disclosed in this application is advantageous over the conventional steam trap apparatus. It is flexible and efficient. It is highly controllable since the steam trap itself is an actuated valve attached to a programmable control system. It allows for real-time data collection during any operation. It eliminates extra piping and valves by utilizing a single actuated valve for both CIP and SIP. Finally, it is truly sanitary because the steam trap valve can be a sanitary valve, made with compliant material to withstand sterilization and steaming, and is without crevices and hard to reach, hard to clean openings.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

Experimental Details

A controllable and cleanable Steam Trap Apparatus (CCST), comprising a single sanitary cleanable valve, an electronically controlled temperature sensor, and an automated control system, was tested in several configurations.

Experimental Procedures

Figure 3:
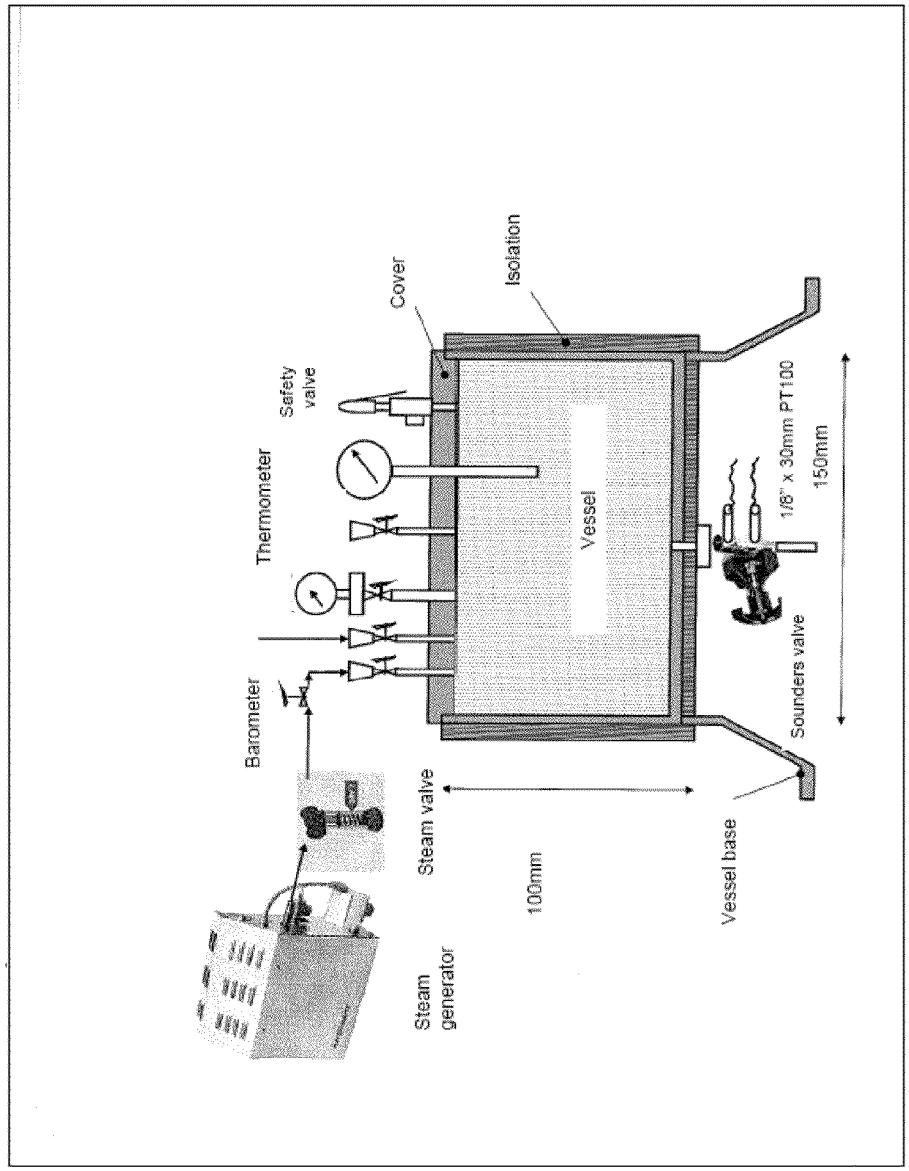
FIG. 3: shows a detailed schematic diagram of the Controllable and Cleanable Steam Trap Apparatus (CCST) tested. The apparatus allows condensate and other unwanted gas to be separated from the steam system so that the steam in the steam system can reach its destination in as dry a state as possible to perform its task efficiently and economically. A temperature sensor manufactured by GIWISS (PT 100) is positioned at a point in the steam system where condensate, air, and non-condensable gas are likely to gather, senses the temperature in the area, and sends a corresponding output to a control system, which compares the output from the PT 100 temperature sensor to the saturation temperature at the specific operating condition, as determined by an algorithm or user input, and sends an output to a pneumatic valve manufactured by Sounders (Sounders valve) positioned downstream from the PT 100 temperature sensor to open to release condensate, or to close to retain steam. In this exemplary embodiment, the apparatus simplifies the complicated existing system for sterilization-in-place (SIP) by eliminating the need for extra valves.
Figure 4:
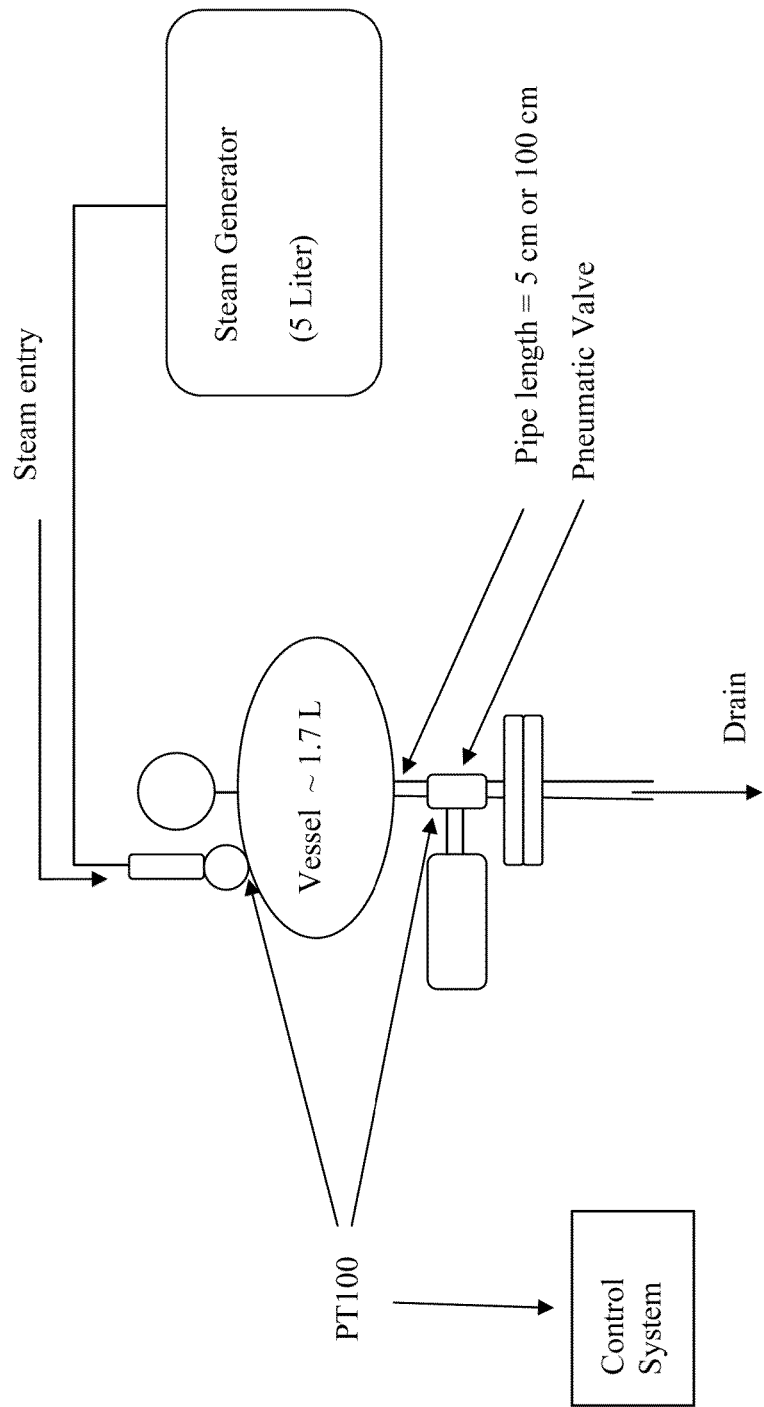
FIG. 4: shows a schematic diagram of the CCST tested, which includes: a 5 liter steam generator; a ~1.7 liter Stainless Steel vessel; a control system for monitoring the temperature and the valves status, manufactured by Biosoft; a pneumatic valve controlled by the control system, manufactured by Sounders, with a distance between the vessel and the valve of 5 cm or 100 cm; and two PT 100 temperature sensors manufactured by GEWISS.
Figure 5:
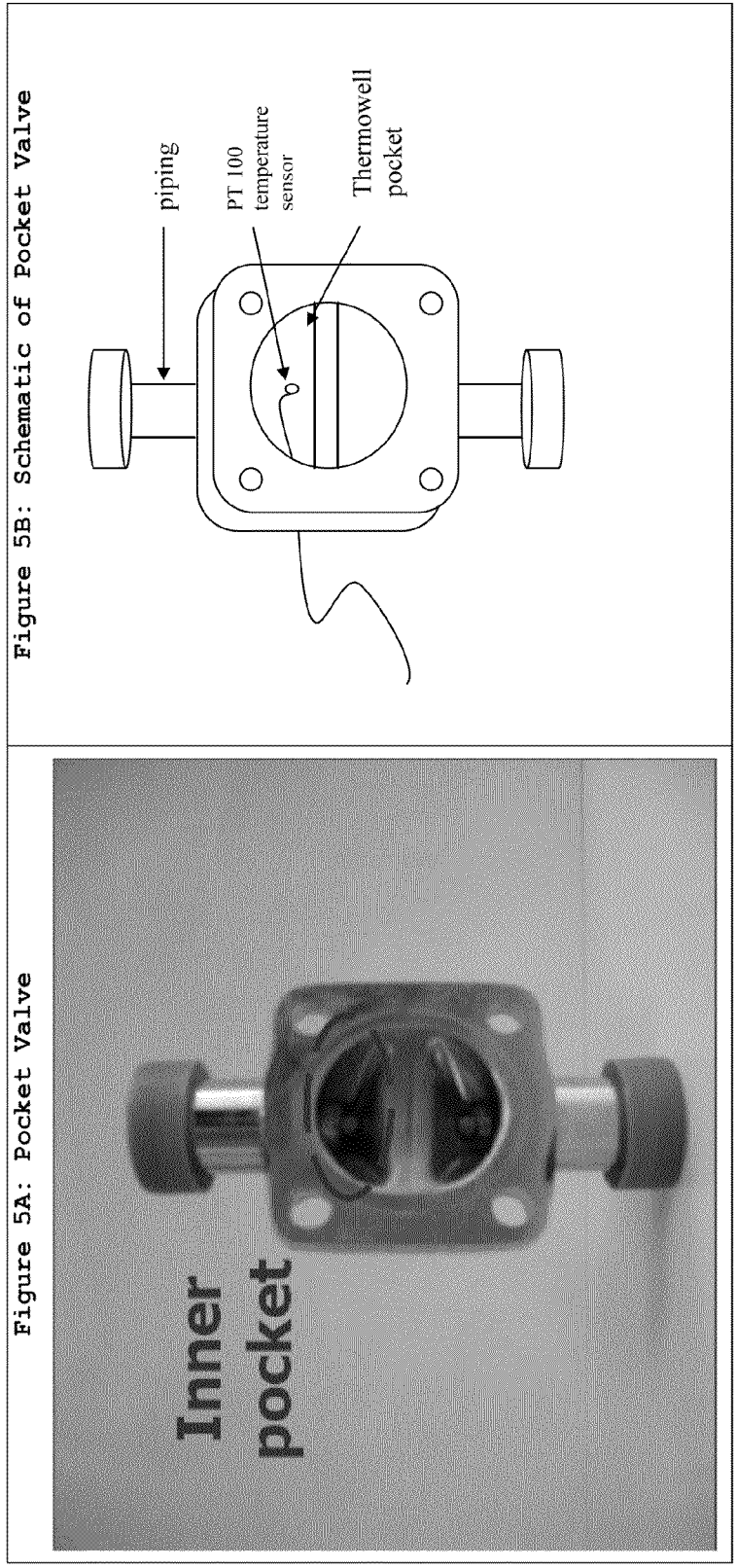
FIG. 5: shows a photograph (FIG. 5A) and the corresponding schematic diagram (FIG. 5B) of the pocket valve used. A PT 100 temperature sensor (TS) is positioned at the valve's thermowell pocket. The temperature at the pocket was measured with and without glycerol.

The CCST was built as shown in FIGS. 3 and 4. The control system in the CCST regulated the pneumatic valve's opening according to the vessel's sensor temperature and an input of a number of seconds which indicated the interval between the valve's "on" status and "off" status. The valve's "on status" indicated that the valve was open. The valve's "off" status indicated that the valve was closed.

The sterilization effectiveness was determined by reaching the sterilization temperature (at least 122° C.) and stability at the specified temperature for at least 30 minutes.

The valve's status was determined by three different ranges: room temperature to a certain setpoint, the certain setpoint to the sterilization temperature (122° C.) and stability at the sterilization temperature.

Nine configurations were tested in accordance with a variable matrix as shown in Table 1.

TABLE 1

| | | | | | | | |
|---|---|---|---|---|---|---|---|
| | | | | The variable matrix | | | |
| number | Glycerol | Pressure (bar) | Temperature (° C.) | Valve PT position | Pipe length (cm) | Pipe diameter (inch) | Valve diameter (inch) |
| 1 | + | 2.9 | 140 | Pocket | 5 | ½ | ½ |
| 2 | − | 2.9 | 140 | Pocket | 5 | ½ | ½ |
| 3 | − | 2.9 | 140 | Direct | 5 | ½ | ½ |
| 4 | − | 2.9 | 140 | Pocket | 100 | ½ | ½ |
| 5 | − | 2.5 | 129 | Direct | 100 | ½ | ½ |
| 6 | − | 2.9 | 140 | Direct | 100 | ½ | ½ |
| 7 | − | 2.25 | 124 | Direct | 100 | ½ | ½ |
| 8 | − | 2.9 | 140 | Direct | 5 | ⅜ | ⅜ |
| 9 | − | 2.9 | 140 | Direct | 100 | ⅜ | ⅜ |

The valve configurations tested were: ⅜" and ½" diameter valves, with or without a thermowell pocket.

The pipe configurations tested were: ⅜" and ½" diameter Stainless Steel (S.S.) pipes at a length of 5 cm and 100 cm, representing the distance between the valve and the vessel.

Figure 6:
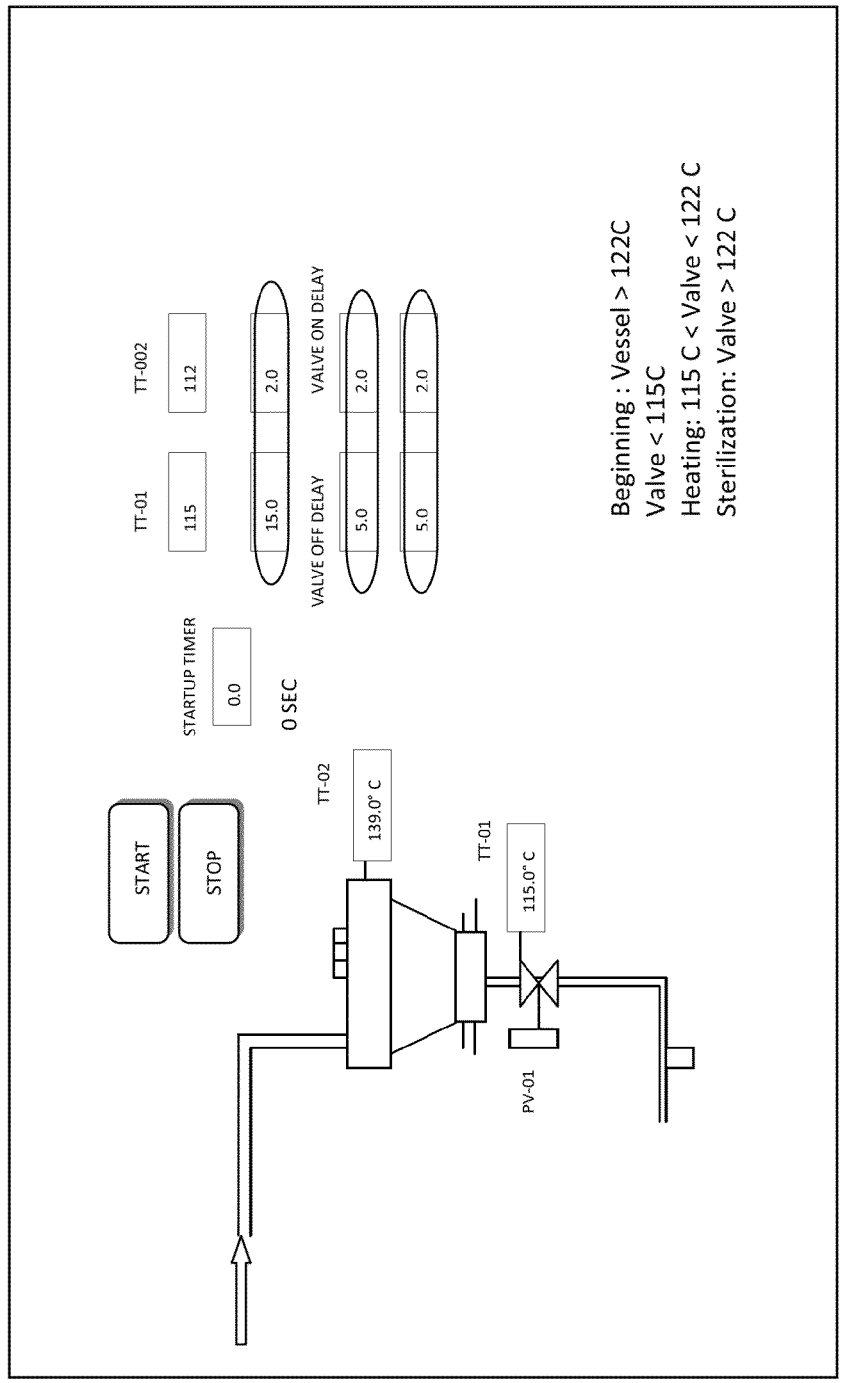
FIG. 6: shows a schematic of the control system user interface.
Figure 7A:
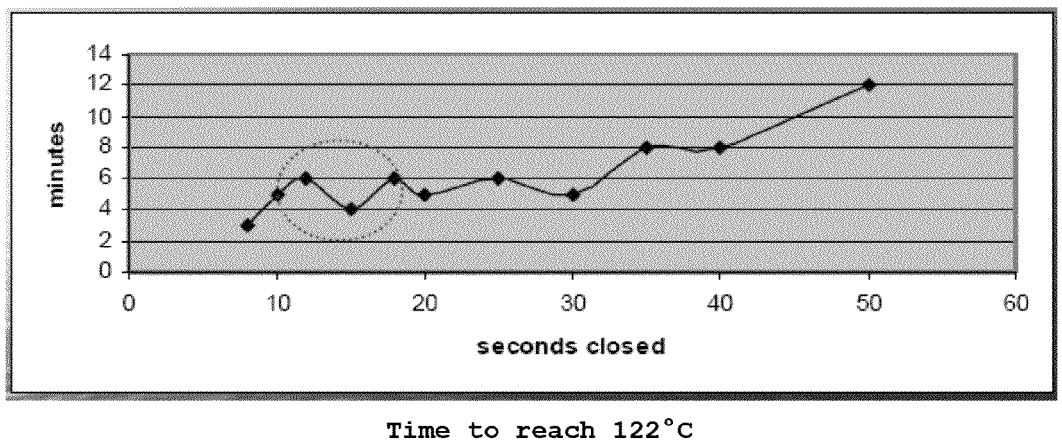
FIG. 7A shows the amount of time the system takes to reach 122° C. for various "valve off" delay time, where the "valve on" delay is set at 2 seconds.
Figure 7B:
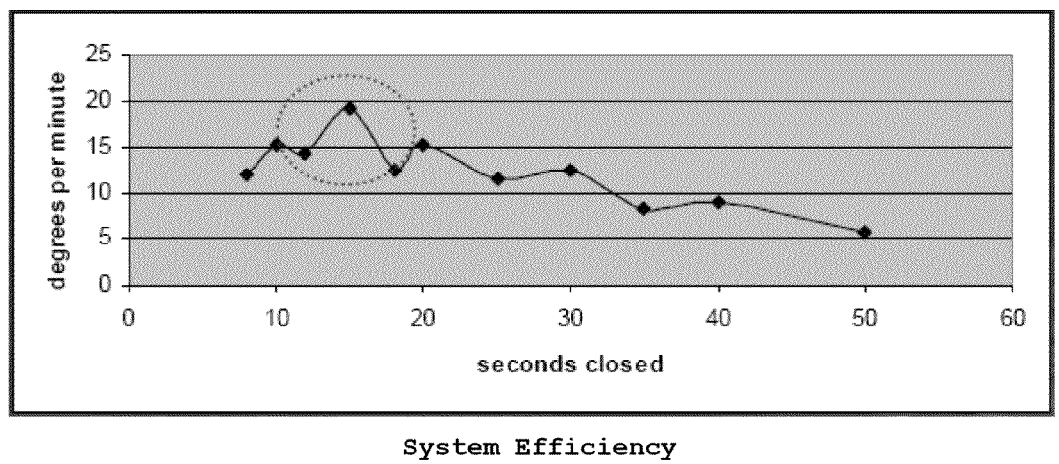
FIG. 7B shows the efficiency of the CCST at "valve off" delay time. The graphs show that 2 seconds on and 15 seconds off is the most efficient configuration.
Figure 8:
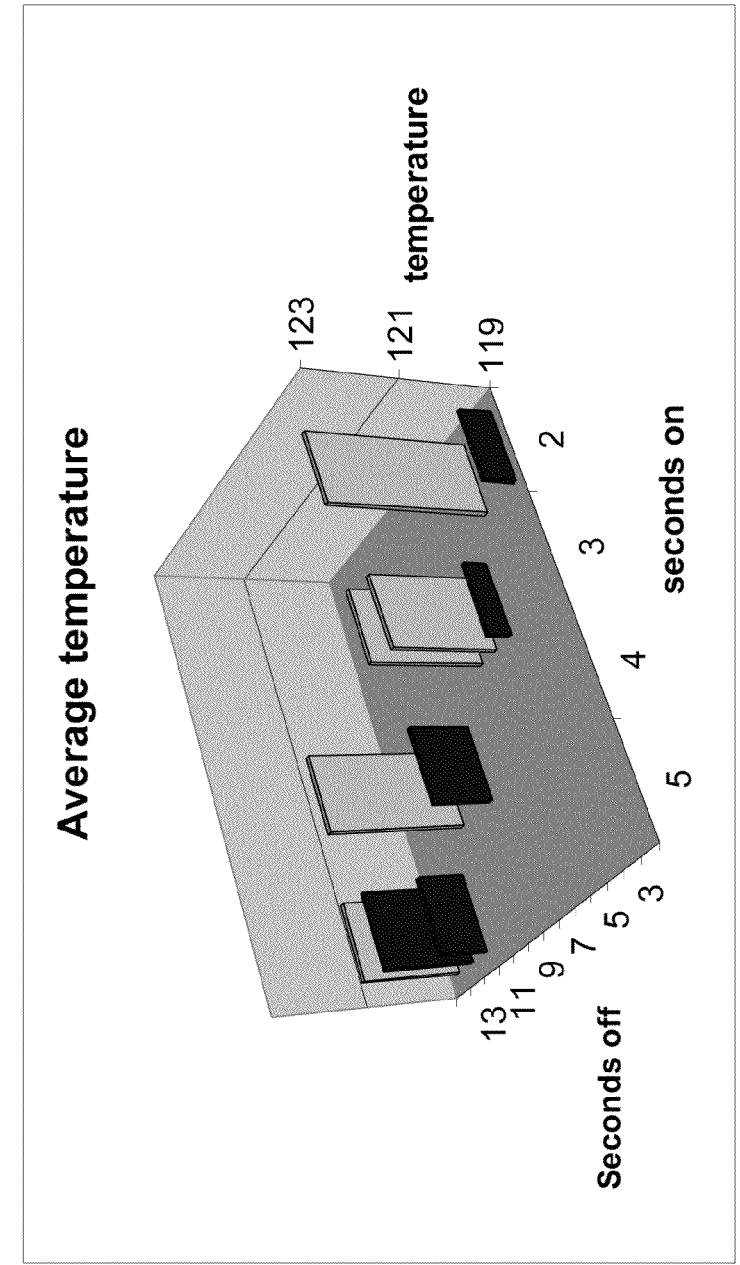
FIG. 8: shows the average temperature for different valve opening time intervals according to Configuration 1. For Configuration 1, 5 different "valve on"/"valve off" time interval combinations resulted in average temperatures that fell within the 121-123° C. range, i.e., the working range. For example, a setting of 2 seconds on and 5 seconds off resulted in an average temperature that fell within the working range.
Figure 9:
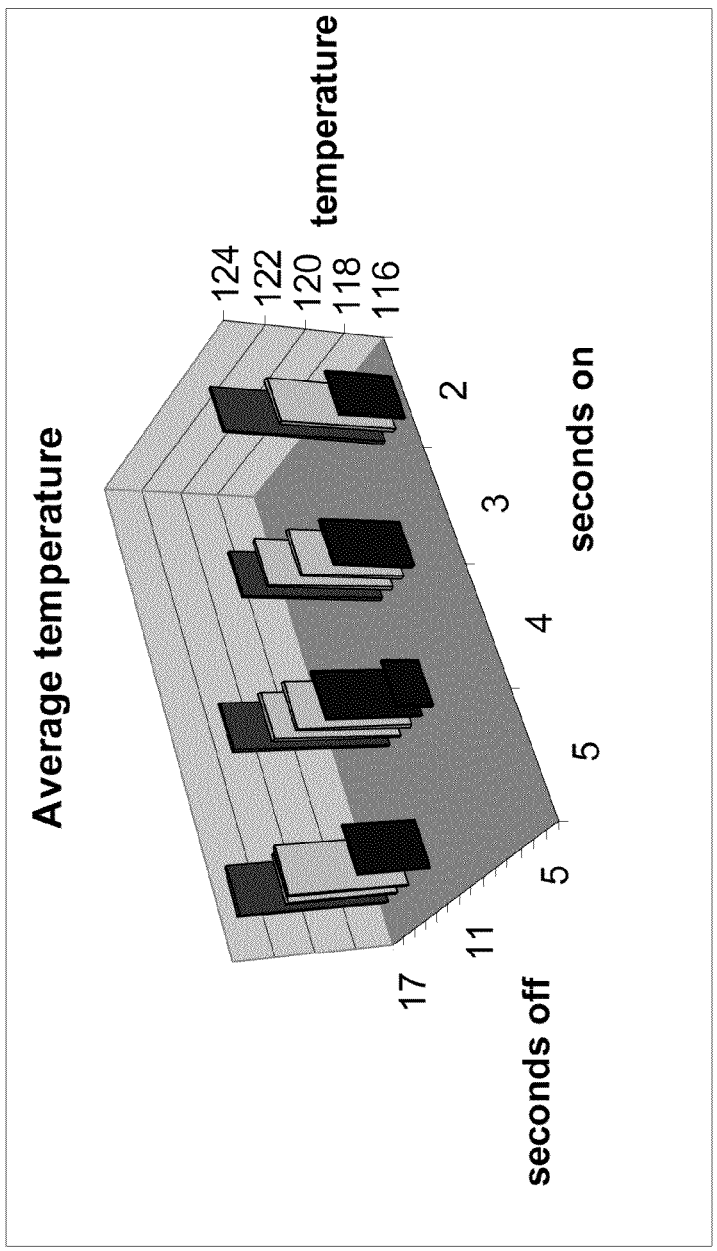
FIG. 9: shows the average temperature for different valve opening time intervals according to Configuration 2. For Configuration 2, 6 different "valve on"/"valve off" time interval combinations resulted in average temperatures that fell within the working range. For example, a setting of 2 seconds on and 4 seconds off resulted in an average temperature that fell within the working range.
Figure 10:
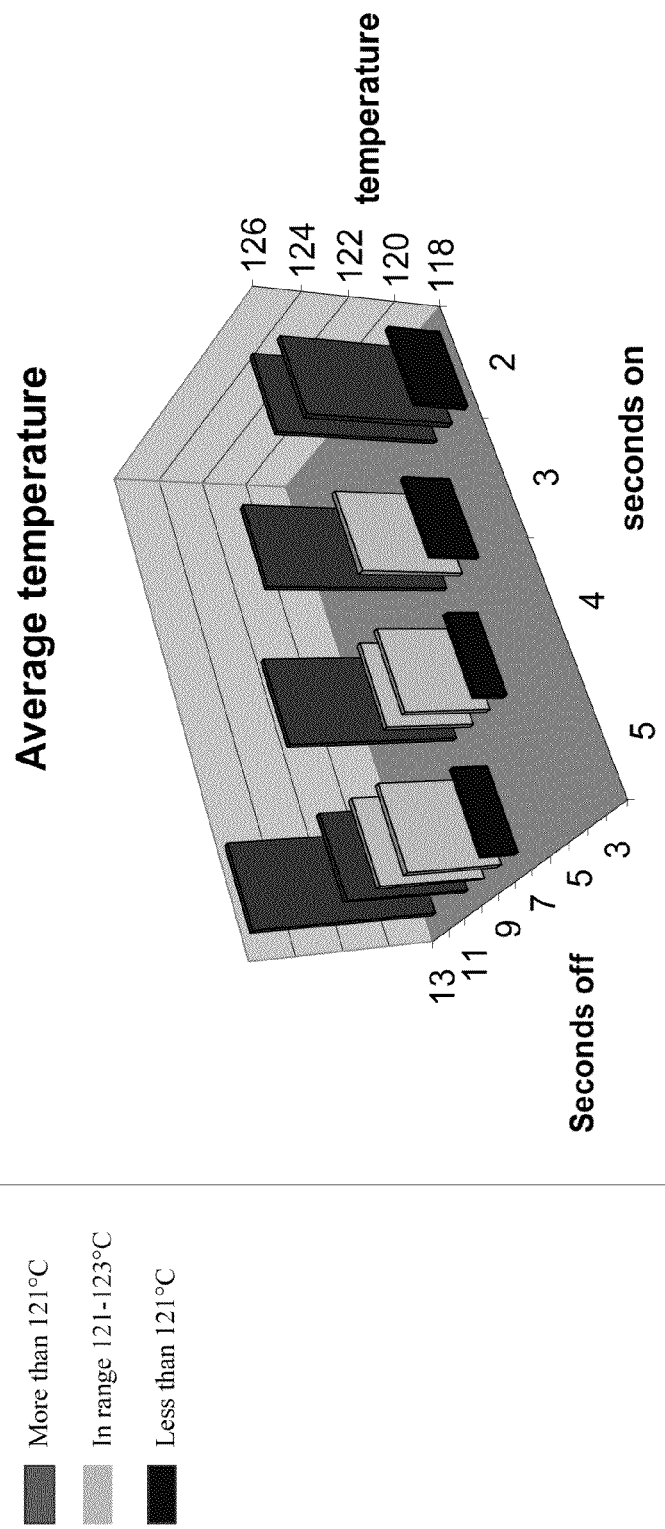
FIG. 10: shows the average temperature for different valve opening time intervals according to Configuration 3. For Configuration 3, 5 different "valve on"/"valve off" time interval combinations resulted in average temperatures that fell within the working range. For example, a setting of 3 seconds on and 5 seconds off resulted in an average temperature that fell within the working range.
Figure 11:
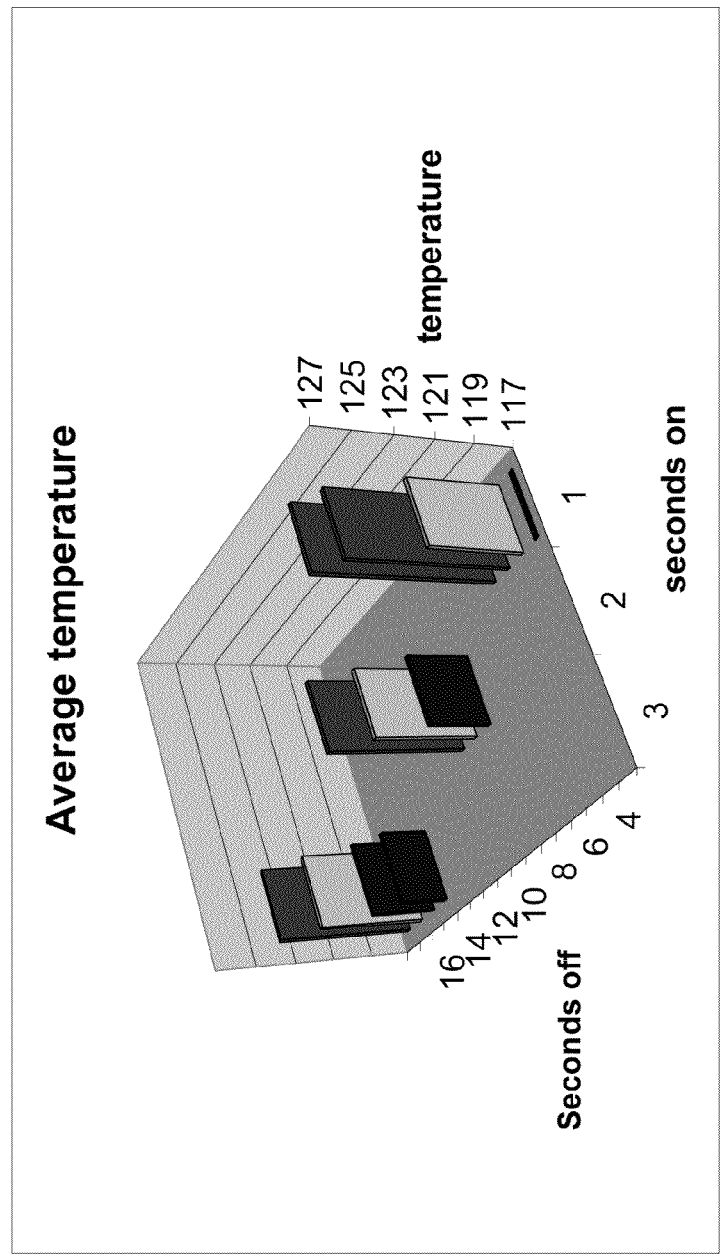
FIG. 11: shows the average temperature for different valve opening time intervals according to Configuration 5. For Configuration 5, 3 different "valve on"/"valve off" time interval combinations resulted in average temperatures that fell within the working range. For example, a setting of 1 second on and 4 seconds off resulted in an average temperature that fell within the working range.
Figure 12:
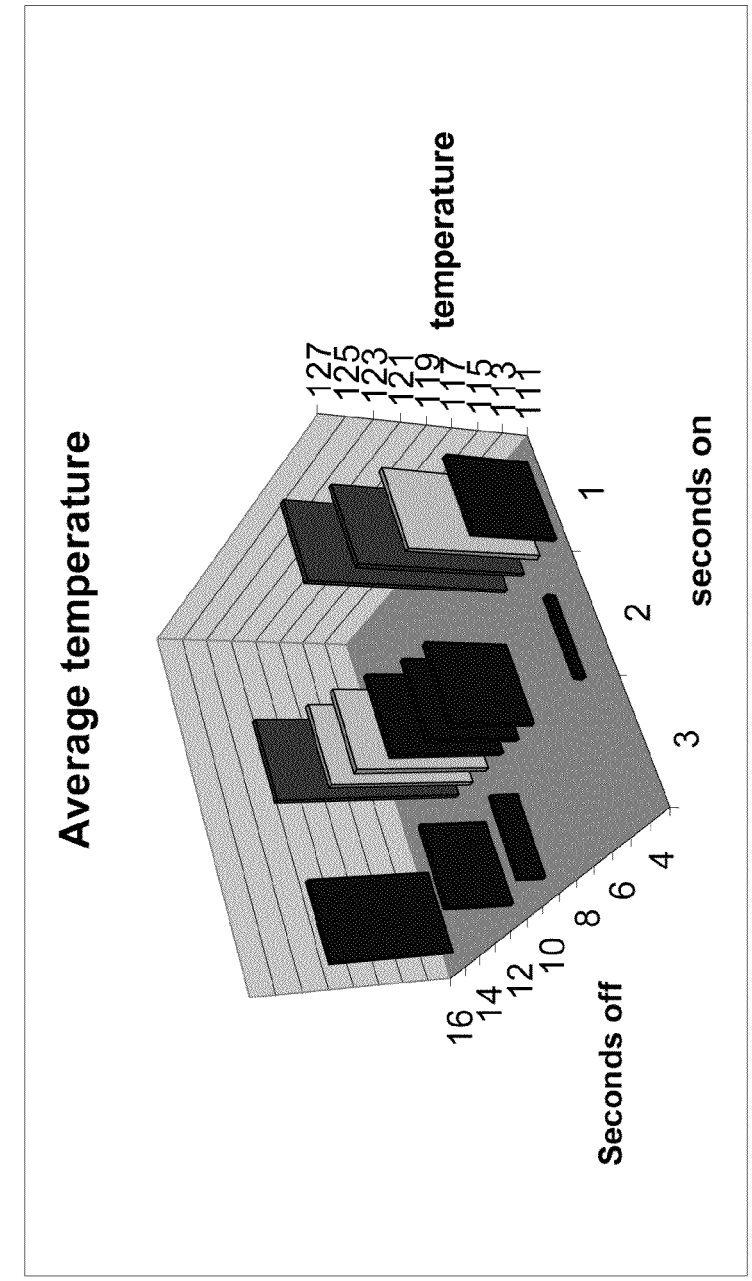
FIG. 12: shows the average temperature for different valve opening time intervals according to Configuration 6. For Configuration 6, 3 different "valve on"/"valve off" time interval combinations resulted in average temperatures that fell within the working range. For example, a setting of 1 second on and 4 seconds off resulted in an average temperature that fell within the working range.
Figure 13:
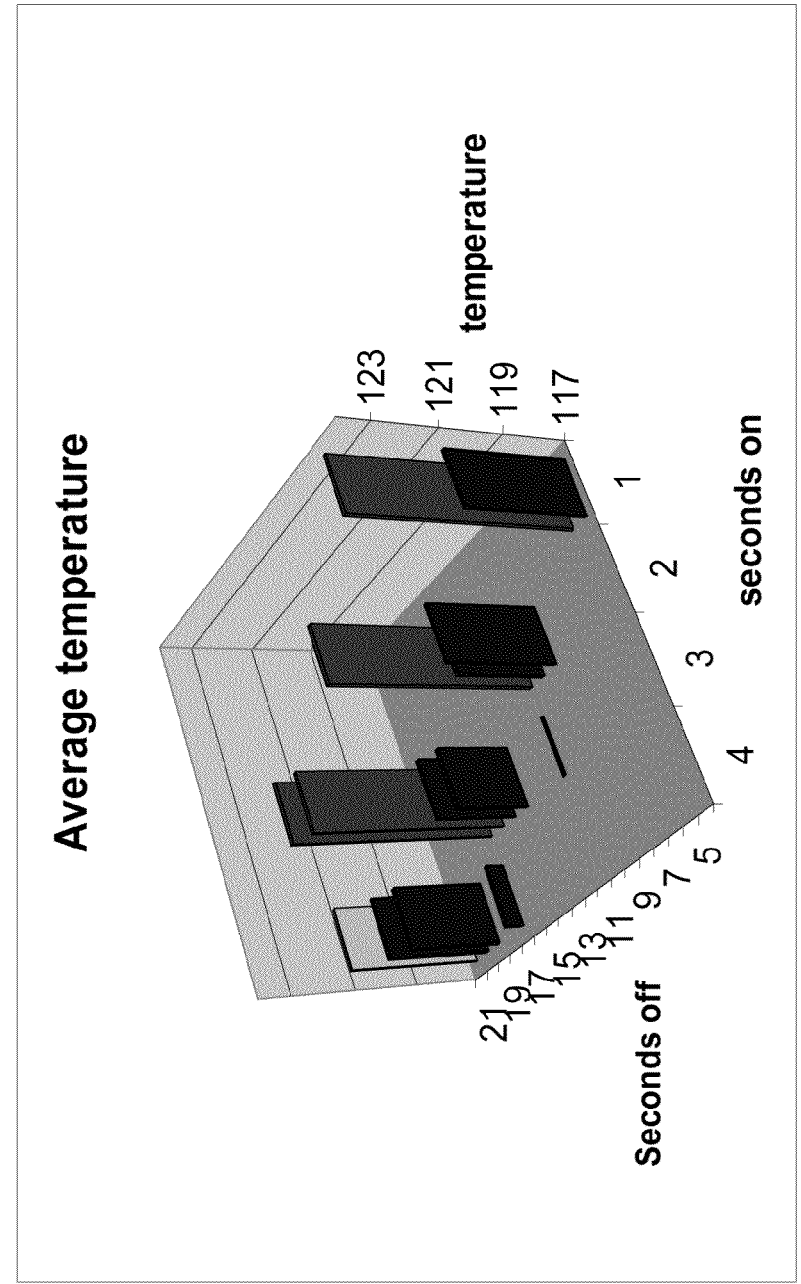
FIG. 13: shows the average temperature for different valve opening time intervals according to Configuration 7. For Configuration 7, only 1 "valve on"/"valve off" time interval combination resulted in an average temperature that fell within the working range. The working setting is 4 seconds on and 20 seconds off.
Figure 14:
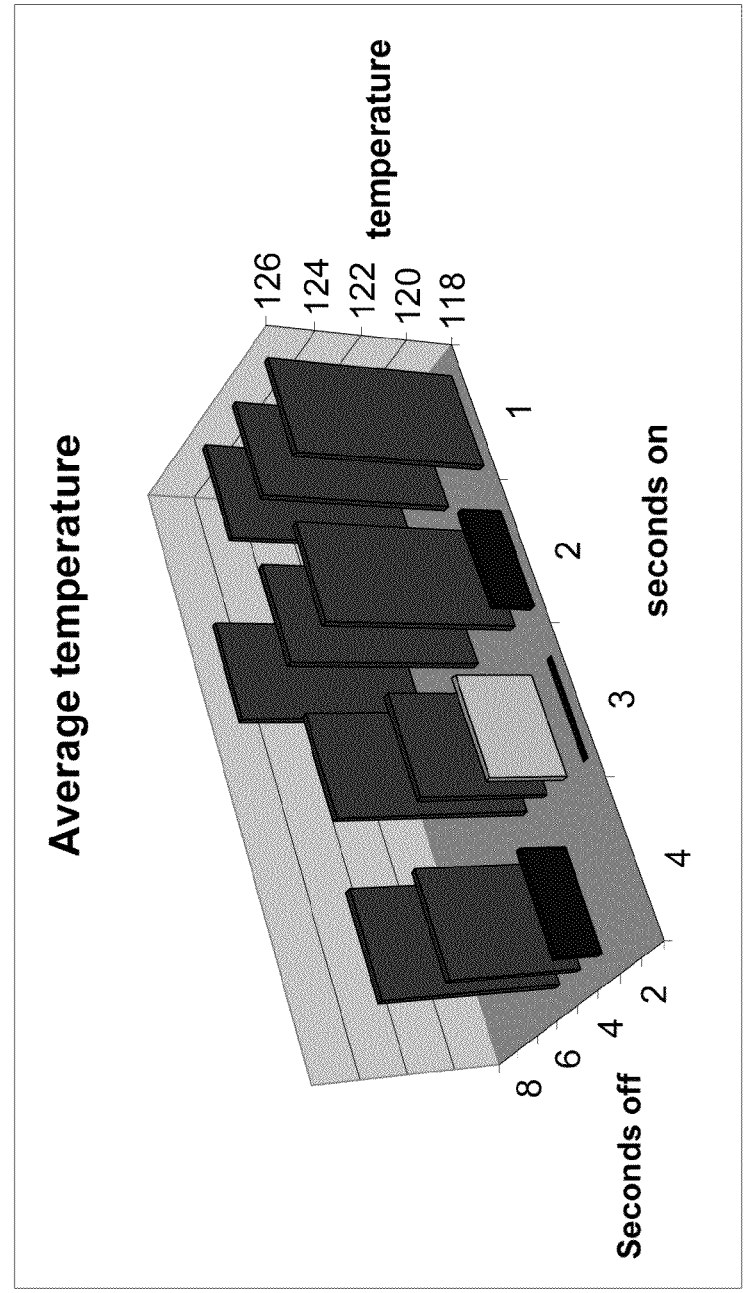
FIG. 14: shows the average temperature for different valve opening time intervals according to Configuration 8. For Configuration 8, only 1 "valve on"/"valve off" time interval combination resulted in an average temperature that fell within the working range. The working setting is 3 seconds on and 3 seconds off.
Figure 15:
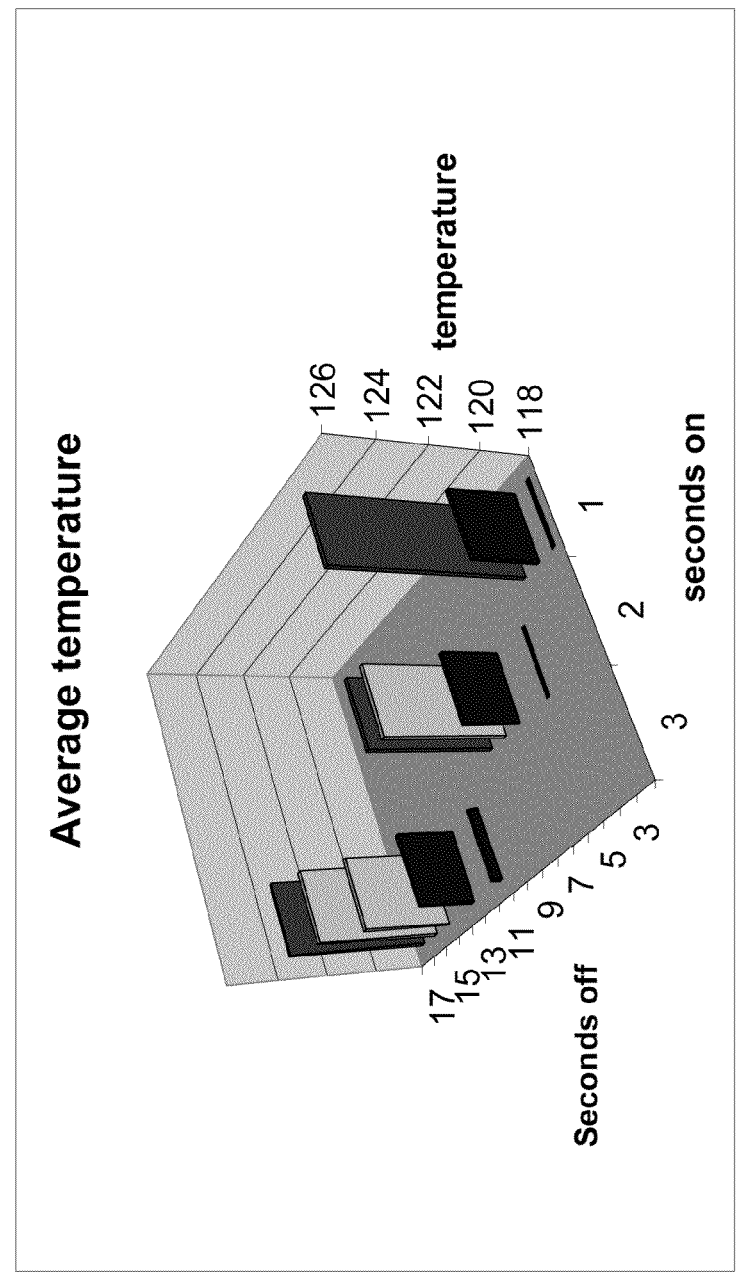
FIG. 15: shows the average temperature for different valve opening time intervals according to Configuration 9. For Configuration 9, 3 different "valve on"/"valve off" time interval combinations resulted in average temperatures that fell within the working range. For example, a setting of 2 seconds on and 8 seconds off resulted in an average temperature that fell within the working range.

The temperature was measured and recorded by the control system every minute. FIG. 6 shows a screenshot of the control system user interface. The temperature was measured at the valve's body and the pipe's body, with and without a thermowell pocket. The temperature was also measured at the vessel, the valve's pocket, the valve directly, and the pipe. The temperature at the pocket was measured with and without glycerol.

Steam pressure was tested in the range of 2.25-2.9 bars.

Process Overview

The system as shown in FIG. 3 was tested. Water was fed to the steam generator and was heated until the pressure of the steam reaches 2.9 bars. The valve between the vessel and the steam generator was then opened. The valve interval times in seconds were entered into the control system and the SIP operation was initiated by pressing "start" button on the control system interface. The control system monitored and recorded the temperature from the vessel and the valve thermometers every minute. The temperature of sterilization was measured for at least 30 minutes.

Materials

1. Untreated water for steam generation.
2. Glycerol 99%, manufactured by Riedel-de haen, cat. 62850.

Equipment

3. A 5 liter steam generator.
4. A 1.75 liter Stainless Steel vessel.
5. A control system for monitoring the temperature and the valve's status, manufactured by Biosoft.
6. A pneumatic valve controlled by the control system, manufactured by Sounders. Valves' diameters were ⅜" and ½". S.S. pipes with diameters of ⅜" and ½" and lengths of 5 cm and 100 cm were used.
7. Two PT 100, 10 A 250 v thermometers with a diameter of ⅛" and length of 30 mm, manufactured by GEWISS, were used.

Results

The experimental results indicate that there was a working range of operating time (seconds) and pressure for any configuration in which the sterilization was successful (121-123° C. maintained for at least 20 minutes).

The average temperatures for the various valve opening time intervals are shown in FIGS. 8-15. The light gray bars in the graphs indicate that the temperature is in the range of 121-123° C. (i.e., in working range).

Configuration 4 failed to reach the desired temperature of 122° C. at the valve. Furthermore, the results showed high heat loss between the vessel and the valve. Therefore, no further experiments were done in accordance with this configuration, and no bar graph is available.

For configurations utilizing the 5 cm pipe, the most stable result was achieved by the pocket, ½" valve with glycerol configuration, although it also generated the highest temperature difference between the vessel and the valve. The pocket, ½" valve, without glycerol configuration was similarly highly stable but generated high ΔT between the vessel and the valve. The direct measurements configurations yielded low temperature differences between the vessel and the valve, although a working range was not established for the ⅜" valve case.

For configurations utilizing the 100 cm pipe, the pocket configuration generated a large temperature difference between the vessel and the valve, therefore a working range was not established. Between the ⅜" to the ½" valves, the ½" valve was more efficient since it yielded a lower temperature difference between the vessel and the valve. The 2.25 bar configuration failed to establish a working range. Hence, it was determined that a minimal pressure of 2.5 bar is required for the process. Finally, the variance increase was proportional to the seconds in which the valve was open, regardless of the number of seconds in which the valve was closed.

Overall, the results show that in comparison with the pocket configuration, the direct measurement configurations maintained a smaller difference between the vessel's temperature and the valve's temperature.

DISCUSSION AND CONCLUSION

The results show that the CCST is compatible to replace the conventional steam trap and CIP valves.

A working range was found and established for most of the configurations. The pocket with glycerol configuration generated the most stable sterilization, although a high temperature difference was formed between the vessel and the valve. Direct measurement configuration generated the lowest temperature difference between the vessel and the valve, although this configuration generated the highest temperature variance. A minimal opening time interval of the valve would decrease the variance.

Programming of the system is required for different vessels. Therefore, an automated control system which is guided by the steam saturation curve is required for optimal compatibility of the CCST to any valve system.

What is claimed is:

1. An apparatus for removing condensate, air, or non-condensable gas from vapor space in a vapor system while preventing a loss of vapor, the apparatus comprising:
    a) a temperature sensor, positioned at a point in the vapor system where condensate, air, or non-condensable gas collect,
    b) a pressure sensor positioned in the vapor system,
    c) an actuated valve in a position allowing for a release of condensate, air, or non-condensable gas from the vapor space, and
    d) a control system which receives output from said temperature sensor and said pressure sensor and determines whether the output represents a presence of condensate, air, or non-condensable gas and then determines whether to open the actuated valve to release condensate, air or non-condensable gas from the vapor space based on the temperature reading from the temperature sensor and the pressure reading from the pressure sensor, wherein the control system is programmed to allow input of time intervals which represent a time delay between a signal to open or close the actuated valve and the opening or closing of the actuated valve.

2. The apparatus of claim 1, wherein the temperature sensor is positioned in the actuated valve.

3. The apparatus of claim 1, wherein the actuated valve is a sanitary valve.

4. The apparatus of claim 1, wherein the temperature sensor is located directly in a pipe of the vapor system or the actuated valve.

5. The apparatus of claim 1, wherein the temperature sensor is located within a thermowell pocket.

6. The apparatus of claim 5, wherein the thermowell pocket further comprises glycerol.

7. The apparatus of claim 1, wherein the actuated valve is positioned downstream from the temperature sensor.

8. The apparatus of claim 1, wherein the vapor is steam.

9. The apparatus of claim 8, wherein the steam is saturated steam.

10. A method for removing condensate, air, or non-condensable gas from vapor space in a vapor system while preventing a loss of vapor, the method comprising:
    a) measuring a temperature at a region in the vapor system where condensate, air, or non-condensable gas collect;
    b) measuring a pressure in the vapor system;
    c) determining whether the temperature obtained in a) and the pressure obtained in step b) represents a presence of condensate, air, or non-condensable gas; and
    d) opening an actuated valve if the temperature measured in a) and the pressure measured in b) is determined to represent the presence of condensate, air, or non-condensable gas, wherein the determining step in b) is automated by a control system which is programmed to allow input of time intervals which represent a time delay between a signal to open or close the actuated valve and the opening or closing of the actuated valve.

11. The method of claim 10, wherein the temperature is obtained at the actuated valve.

12. The method of claim 10, wherein the actuated valve is a sanitary valve.

13. The method of claim 10, wherein the temperature is obtained directly from within a pipe of the vapor system or the actuated valve.

14. The method of claim 10, wherein the temperature is obtained from within a thermowell pocket.

15. The method of claim 14, wherein the thermowell pocket further comprises glycerol.

16. The method of claim 10, wherein the actuated valve opening time interval is no more than 2 seconds.

17. The method of claim 16, wherein the actuated valve opening time interval is no more than 1 second.

18. The method of claim 10, wherein the pressure in the vapor space is greater than 2.25 bar.

19. The method of claim 18, wherein the pressure in the vapor space is at least 2.5 bar.

20. The method of claim 10, wherein the vapor is steam.

21. The method of claim 20, wherein the steam is saturated steam.

22. An apparatus for removing condensate, air, or non-condensable gas from vapor space in a vapor system while preventing a loss of vapor, the apparatus comprising:
 a) a temperature sensor, positioned at a point in the vapor system where condensate, air, or non-condensable gas collect,
 b) a pressure sensor positioned in the vapor system,
 c) an actuated valve in a position allowing for a release of condensate, air, or non-condensable gas from the vapor space, and
 d) a control system which receives output from said temperature sensor and said pressure sensor and determines whether condensate is present, whether air is present, and whether non-condensable gas is present based on the temperature reading from the temperature sensor and the pressure reading from the pressure sensor and then determines whether to open or close the actuated valve.

23. The apparatus of claim 22, wherein the temperature sensor is positioned in the actuated valve.

24. The apparatus of claim 23, wherein the actuated valve is a sanitary valve.

25. The apparatus of claim 23, wherein the control system is programmed to allow input of time intervals which represent a time delay between a signal to open or close the actuated valve and the opening or closing of the actuated valve.

26. The apparatus of claim 23, wherein the vapor is steam.

27. The apparatus of claim 26, wherein the steam is saturated steam.

28. A method for removing condensate, air, or non-condensable gas from vapor space in a vapor system while preventing a loss of vapor, the method comprising:
 a) measuring a temperature at a region in the vapor system where condensate, air, or non-condensable gas collect;
 b) measuring a pressure in the vapor system,
 c) determining whether condensate is present, whether air is present, and whether non-condensable gas is present based on the temperature obtained in a) and the pressure obtained in b); and
 d) opening an actuated valve if the temperature measured in a) and the pressure measured in b) is determined to represent presence of condensate, presence of air, or presence of non-condensable gas.

29. The method of claim 28, wherein the temperature is obtained at the actuated valve.

30. The method of claim 28, wherein the actuated valve is a sanitary valve.

31. The method of claim 28, wherein the determining step in b) is automated by a control system which is programmed to allow input of time intervals which represent a time delay between a signal to open or close the actuated valve and the opening or closing of the actuated valve.

32. The method of claim 28, wherein the vapor is steam.

33. The method of claim 32, wherein the steam is saturated steam.

* * * * *

UNITED STATES PATENT AND TRADEMARK OFFICE
CERTIFICATE OF CORRECTION

| | | |
|---|---|---|
| PATENT NO. | : 8,651,126 B2 | |
| APPLICATION NO. | : 12/313563 | |
| DATED | : February 18, 2014 | |
| INVENTOR(S) | : Yehoshua Aloni | |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1153 days.

Signed and Sealed this
Twenty-fourth Day of November, 2015

Michelle K. Lee
*Director of the United States Patent and Trademark Office*